(12) United States Patent
Hong (10) Patent No.: US 7,505,668 B2
(45) Date of Patent: Mar. 17, 2009

(54) BACKLIGHT UNIT AND LIQUID CRYSTAL DISPLAY DEVICE INCLUDING THE SAME

(75) Inventor: Won Kee Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/739,764

(22) Filed: Apr. 25, 2007

(65) Prior Publication Data

US 2007/0258264 A1 Nov. 8, 2007

(30) Foreign Application Priority Data

May 3, 2006 (KR) ...................... 10-2006-0040037

(51) Int. Cl.
*G02B 6/10* (2006.01)
(52) U.S. Cl. ...................... 385/146; 362/606
(58) Field of Classification Search .................. 385/146; 362/606
See application file for complete search history.

(56) References Cited

U.S. PATENT DOCUMENTS 7,293,906 B2 * 11/2007 Mok et al. .................. 362/609

| 2005/0141244 | A1 * | 6/2005 | Hamada et al. | 362/612 |
| 2006/0023451 | A1 * | 2/2006 | Han et al. | 362/249 |
| 2006/0092665 | A1 * | 5/2006 | Kim et al. | 362/612 |
| 2006/0104080 | A1 * | 5/2006 | Kim et al. | 362/555 |
| 2007/0152135 | A1 * | 7/2007 | Watanabe et al. | 250/208.1 |
| 2008/0049448 | A1 * | 2/2008 | Hamada et al. | 362/612 |

* cited by examiner

*Primary Examiner*—Ellen Kim
(74) *Attorney, Agent, or Firm*—Cantor Colburn LLP (57) ABSTRACT

A backlight unit capable of reducing or effectively preventing a luminance deviation includes a plurality of light emitting diodes, a light source substrate on which the plurality of light emitting diodes is mounted, a light guide plate converting line-shaped light generated from the light emitting diodes into a surface-shaped light, an incident surface of the light guide plate contacting an emitting surface of each of the light emitting diodes, a first fixing part formed on the light source substrate in a region overlapping the light guide plate and a second fixing part formed on the light guide plate and coupled to the first fixing part.

19 Claims, 12 Drawing Sheets

BACKLIGHT UNIT AND LIQUID CRYSTAL DISPLAY DEVICE INCLUDING THE SAME

This application claims priority to Korean Patent application No. 2006-0040037 filed on May 3, 2006, and all the benefits accruing therefrom under 35 U.S.C. §119, the contents of which are herein incorporated by reference in its entirety.

BACKGROUND OF THE INVENTION

1. Field of the Invention

The present invention relates to backlight units, and more particularly, to a backlight unit capable of preventing luminance deviation, and a liquid crystal display device including the backlight unit.

2. Description of the Related Art

A liquid crystal display ("LCD") device has gradually extended its application range due to light weight, thin thickness and low consumption power driving. The LCD device applies an electric field to a liquid crystal material having dielectric anisotropy injected between two substrates and controls the amount of light transmitted into the substrates by adjusting the intensity of the electric field, thereby displaying desired images.

Since an LCD panel of the LCD device is a non-luminous element that cannot emit light by itself, the LCD device includes a backlight unit for providing light to the LCD panel.

A light emitting diode ("LED") used for the backlight unit has long life span, fast lighting speed, low power consumption and high impact resistance, compared to a cold cathode fluorescent lamp ("CCFL"), etc. Moreover, the LED is suitable to make the backlight unit relatively small and thin.

Figure 1:
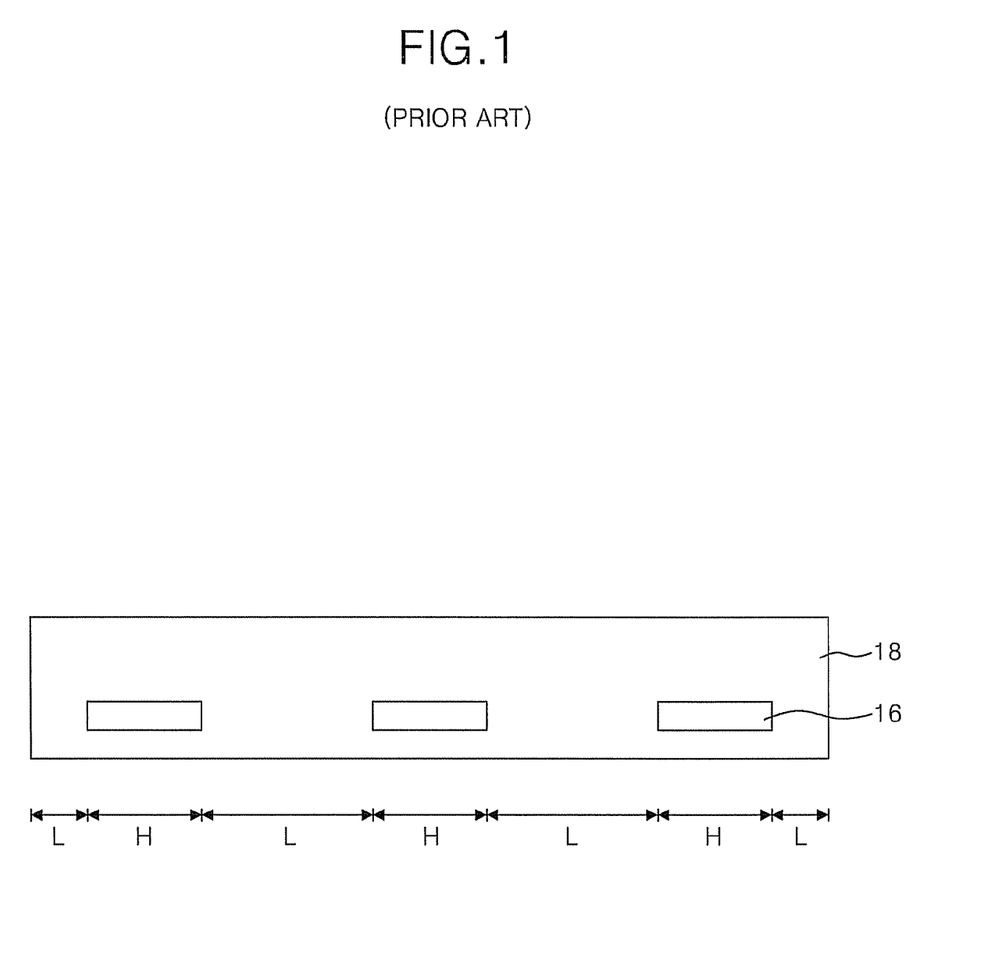
FIG. 1 is a plan view illustrating a light source substrate of a conventional LCD device of the prior art.

FIG. 1 is a plan view illustrating a light source substrate of a conventional LCD device of the prior art. Referring to FIG. 1, LEDs 16 are mounted on a light source substrate 18 supplying control signals or driving voltages to the LEDs 16. The light source substrate 18 may be bonded or adhered, such as by a double coated tape, etc., to a light guide plate (not shown) for guiding incident light from the LEDs 16 toward an LCD panel (not shown).

Since the adhesion of the light source substrate 18 to the light guide plate may be weakened by heat of the LEDs 16 generating the light, the adhesive force between the light guide plate and the light source substrate 18 deteriorates and there occurs a separation region between the light guide plate and the LEDs 16. Furthermore, if vibrations or shocks are applied from the exterior, the separation region may also occur between the light guide plate and the LEDs 16. Since light emitted through the separation region is directly incident on the LCD panel, a luminance deviation occurs in that the light emitted through the separation region seems to be relatively brighter than the light emitted through the other regions.

Moreover, since a separation distance between the light guide plate and the light source substrate 18 may vary due to an assembly deviation between workers during an attachment process of the light guide plate and the light source substrate 18, it is difficult to ensure the uniform luminance characteristic.

Referring again to FIG. 1, a light amount "H" incident on the light guide plate overlapping emitting surfaces of the LEDs 16 is greater than a light amount "L" incident on the light guide plate not overlapping the emitting surfaces of the LEDs 16. Therefore, the incident surface of the light guide plate overlapping the emitting surfaces of the LEDs 16 seems to be relatively brighter than the surface not overlapping the emitting surfaces of the LEDs 16.

BRIEF SUMMARY OF THE INVENTION

An exemplary embodiment provides a backlight unit capable of reducing or effectively preventing a luminance deviation, and a liquid crystal display device including the backlight unit.

In an exemplary embodiment, there is provided a backlight unit including a plurality of light emitting diodes, a light source substrate on which the plurality of light emitting diodes is mounted, a light guide plate contacting an emitting surface of each of the light emitting diodes and converting line-shaped light generated from the light emitting diodes into a surface-shaped light, a first fixing part formed on the light source substrate in a region overlapping the light guide plate and a second fixing part formed on the light guide plate and coupled to the first fixing part.

In an exemplary embodiment, there is provided an LCD device including a backlight unit generating light and an LCD panel displaying images using the light generated from the backlight unit. The backlight unit includes a plurality of light emitting diodes, a light source substrate on which the plurality of light emitting diodes is mounted, a light guide plate contacting an emitting surface of each of the light emitting diodes and converting line-shaped light generated from the light emitting diodes into surface-shaped light, a first fixing part formed on the light source substrate in a region overlapping the light guide plate and a second fixing part formed on the light guide plate and coupled to the first fixing part.

In an exemplary embodiment, the first fixing part is formed in a protrusion shape and substantially parallel with a longer side of the light source substrate and the second fixing part is formed in a groove shape and substantially parallel with a longer side of the light guide plate.

In an exemplary, the first fixing part is formed in a dot-shaped protrusion in a region non-overlapping the emitting surface of each of the light emitting diodes and the second fixing part forms a groove in the dot shape in the region non-overlapping the emitting surface of each of the light emitting diodes.

In an exemplary embodiment, the first fixing part is formed in a line-shaped protrusion in a region non-overlapping the emitting surface of each of the light emitting diodes and the second fixing part forms a groove in the line shape in the region non-overlapping the emitting surface of each of the light emitting diodes.

In an exemplary embodiment, the first fixing part has a width that becomes gradually narrower in a direction away from the surface of the light source substrate.

In an exemplary embodiment, the second fixing part has a width that becomes gradually narrower in a direction toward an upper part from a lower part of the light guide plate.

In an exemplary embodiment, the first and second fixing parts are formed in a right angle triangle, triangular, semicircular or semi-elliptical shape.

In an exemplary embodiment, the first fixing part is coated with a metal layer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" other elements or features would then be oriented "upper" or "above" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The exemplary embodiments of the present invention will now be described with reference to the attached drawings.

Figure 2A:
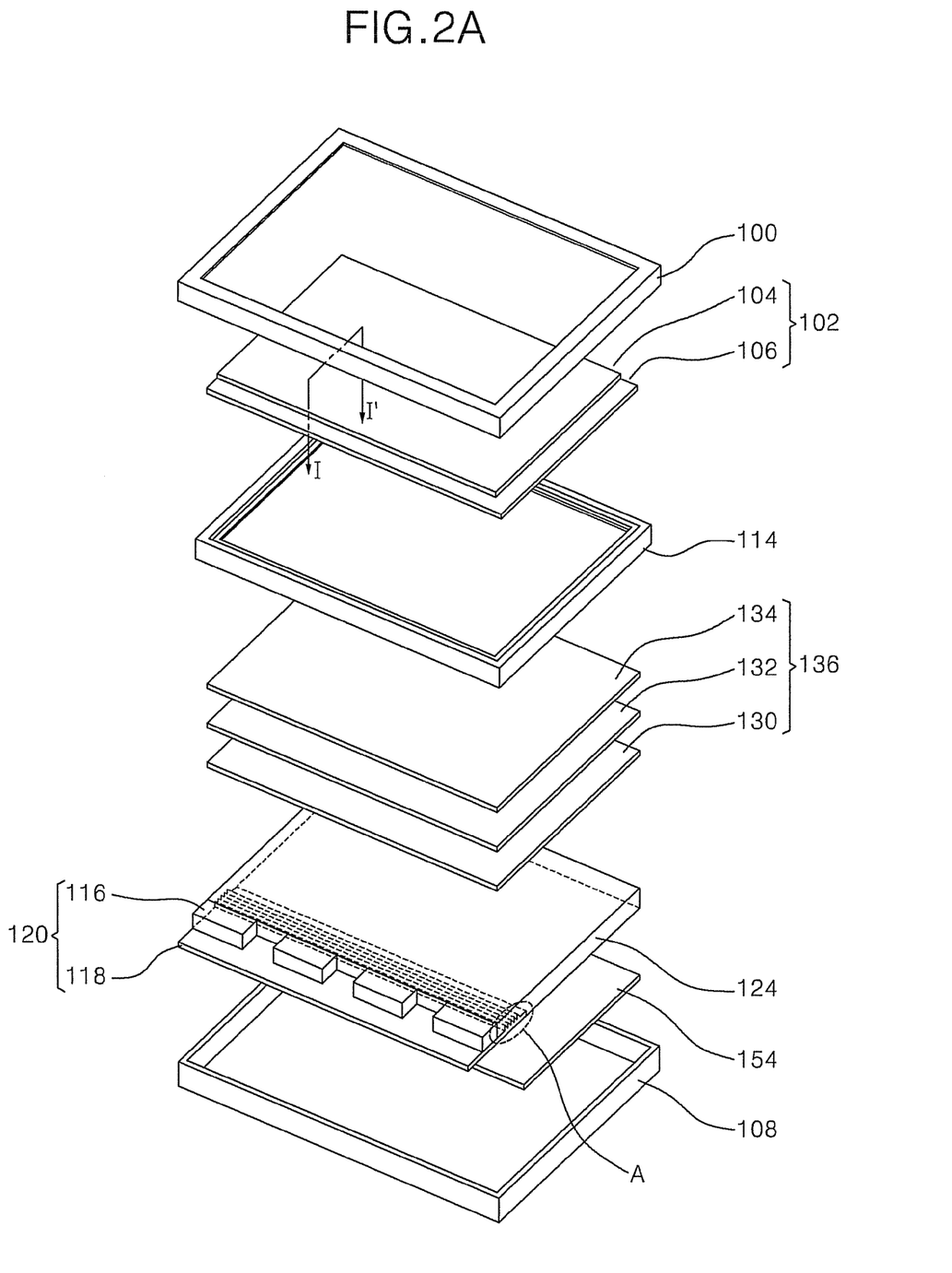
FIGS. 2A and 2B are perspective views illustrating an exemplary embodiment of an LCD device according to the present invention.
Figure 2B:
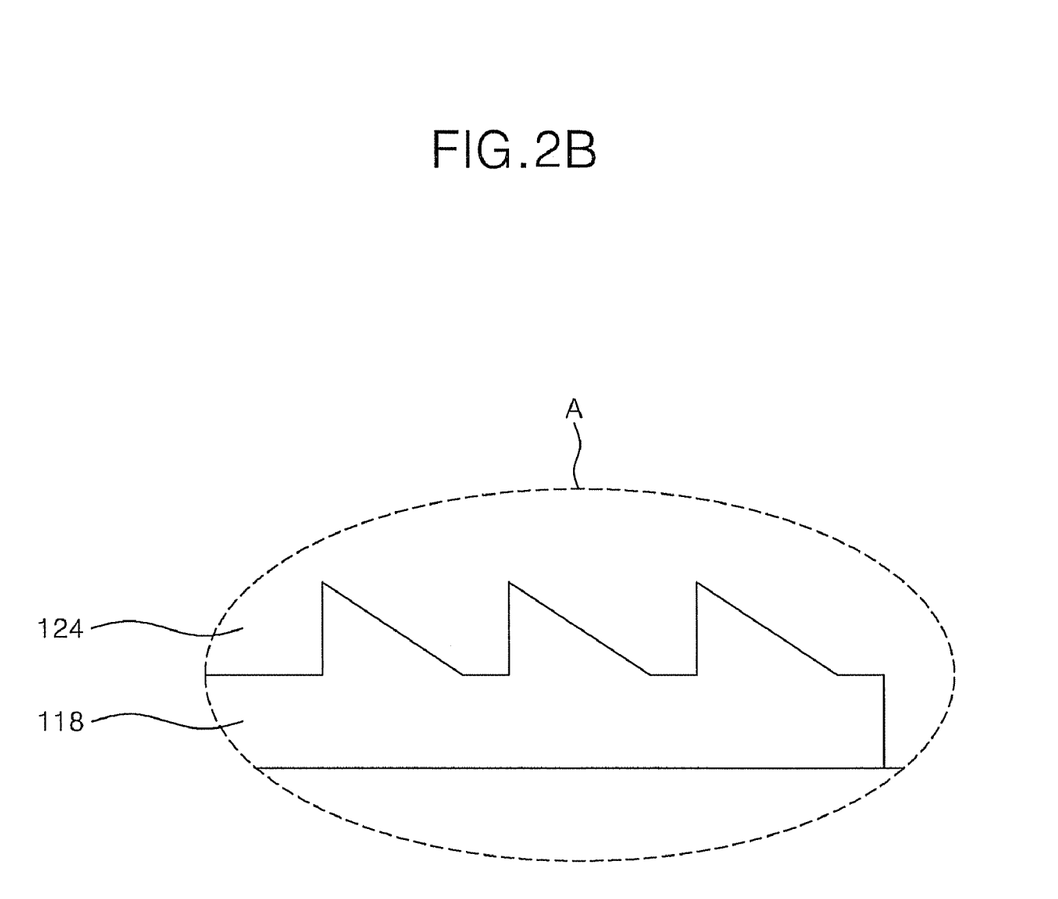
Figure 3:
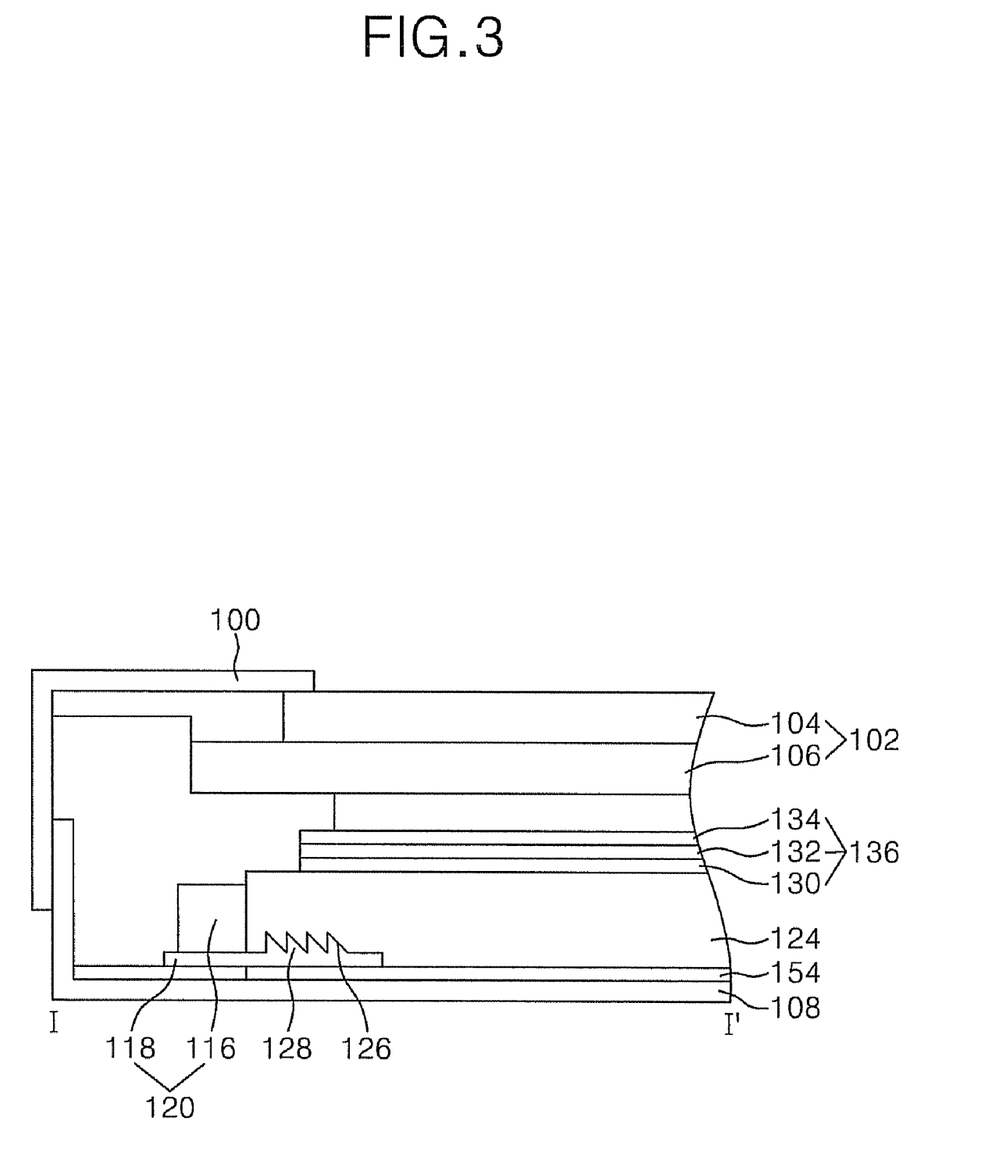
FIG. 3 is a cross-sectional view illustrating the LCD device illustrated in FIG. 2.

FIG. 2A is a perspective view illustrating an exemplary embodiment of an LCD device and FIG. 2B is an enlarged view of portion 'A' illustrated in FIG. 2A according to the present invention. FIG. 3 is a cross-sectional view illustrating the LCD device illustrated in FIG. 2A.

Referring to FIGS. 2A, 2B and 3, the LCD device includes an LCD panel 102, a backlight unit for supplying light to the LCD panel 102, a mold frame 114 in which the LCD panel 102 is mounted, a top chassis 100 for encompassing the edges of the LCD panel 102 and the mold frame 114, and a bottom chassis 108 for containing the backlight unit and its adjacent region therein.

The LCD panel 102 includes a first substrate 106, such as a thin film transistor ("TFT") substrate and second substrate 104, such as a color filter substrate that face each other. Liquid crystals (not shown) are disposed between the TFT substrate 106 and a color filter substrate 104.

The color filter substrate 104 may include a structure in which a color filter array, including black matrixes for reducing or effectively preventing light leakage, color filters for representing colors, a common electrode for forming an electric field perpendicular to a pixel electrode and an upper alignment layer coated for the alignment of the liquid crystals on those elements are formed on an upper substrate.

The TFT substrate 106 may include a structure in which a TFT array, including gate and data lines formed to cross each other, TFTs formed at intersections of the gate and data lines, pixel electrodes connected to the TFTs and a lower alignment layer coated for the alignment of the liquid crystals on those elements are formed on a lower substrate.

The mold frame 114 has an inner sidewall including a stepped projection surface. The backlight unit is mounted on the inner lowermost layer or step of the mold frame 114, the LCD panel 102 is mounted in the mold frame 114 and optical sheets 136 are mounted between the backlight unit and the LCD panel 102.

The upper chassis 100 is formed in a substantially rectangular band (or frame) shape having a perpendicularly bent plane and side surfaces. The upper chassis 100 encompasses the backlight unit, edges of the LCD panel 102 and the mold frame 114. The upper chassis 100 protects the LCD panel 102 and the backlight unit from an external shock and reduces or effectively prevents them from separating from the upper chassis 100 and/or the bottom chassis 108.

The bottom chassis 108 supports the light source substrate 118 enclosing the LEDs 116 and emits heat of the light source substrate 118 and a reflection sheet 154.

The backlight unit includes a light generator 120, a light guide plate 124 guiding the light from the light generator 120 to the LCD panel 102, a plurality of optical sheets 136 deposited sequentially on the light guide plate 124 and a reflection sheet 154 installed under the light guide plate 124.

The optical sheets 136 cause light emitted from the light guide plate 124 to be incident on the LCD panel 102. The optical sheets 136 may refract the light emitted from the light guide plate 124 in a substantially vertical direction to the LCD panel 102 before the light is incident on the LCD panel 102. Advantageously, the efficiency of light is improved. In an exemplary embodiment, the optical sheets 136 may include a diffusion sheet 130, a prism sheet 132 and/or a protection sheet 134.

The diffusion sheet 130 diffuses the light from the light guide plate 124 to have uniform distribution over a wide range such that the light can be irradiated to the LCD panel 102. In exemplary embodiments the diffusion sheet 130 may include a film of a transparent resin of which both surfaces are coated with an optical diffusion member. The prism sheet 132 converts a traveling angle of light diffused by the diffusion sheet 130 into an angle substantially perpendicular to the LCD panel 102. Since the efficiency of light is increased when the light incident on the LCD panel 102 is at right angles with the LCD panel 102, the prism sheet 132 may be used. The protection sheet 134 protects the surface of the prism sheet 132 and diffuses the light passing through the prism sheet 132.

The reflection sheet 154 reflects the light incident into itself through the rear surface of the light guide plate 124 toward the light guide plate 124. In exemplary embodiments, the reflection sheet 154 may include a plate having high light reflectivity and thereby reducing the loss of light.

The light generator 120 includes the LEDs 116 and the light source substrate 118 on which the LEDs 116 are mounted.

The LEDs 116 are mounted on the light source substrate 118 and generate light. The LEDs 116 may be bonded to the light guide plate 124 by any of a number of methods suitable for the purpose described herein. The light generated from the LEDs 116 is incident into the light guide plate 124 through an incident surface formed at one side surface of the light guide plate 124 corresponding to the LEDs.

In exemplary embodiments, the light source substrate 118 is formed of a flexible printed circuit ("FPC") or a printed circuit board ("PCB"). In one exemplary embodiment, at least two LEDs 116 are mounted on the light source substrate 118, such as illustrated in FIG. 2A. The light source substrate 118 emits heat irradiated from the LEDs 116 to the exterior and supplies driving voltage to the LEDs 116.

Figure 4:
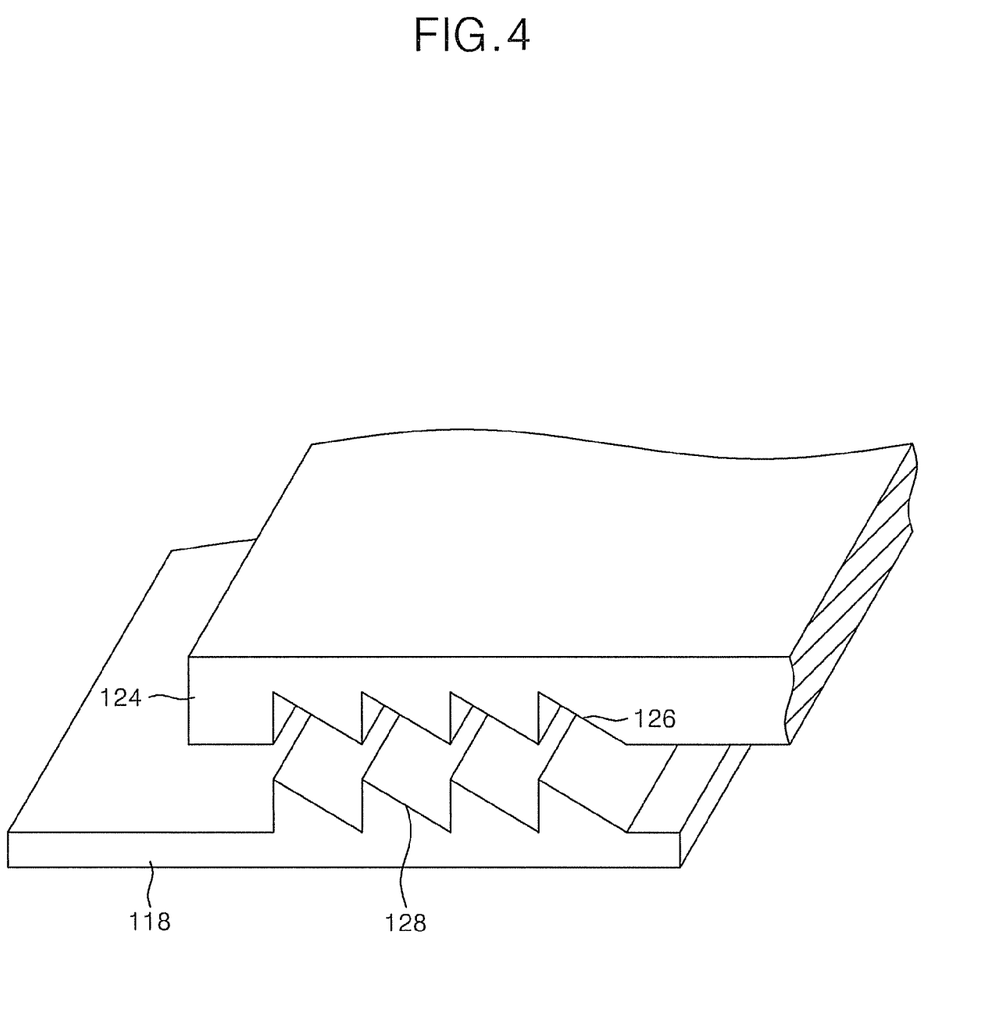
FIG. 4 is a perspective view illustrating an exemplary embodiment of fixing protrusions and fixing grooves illustrated in FIG. 3.
Figure 5A:
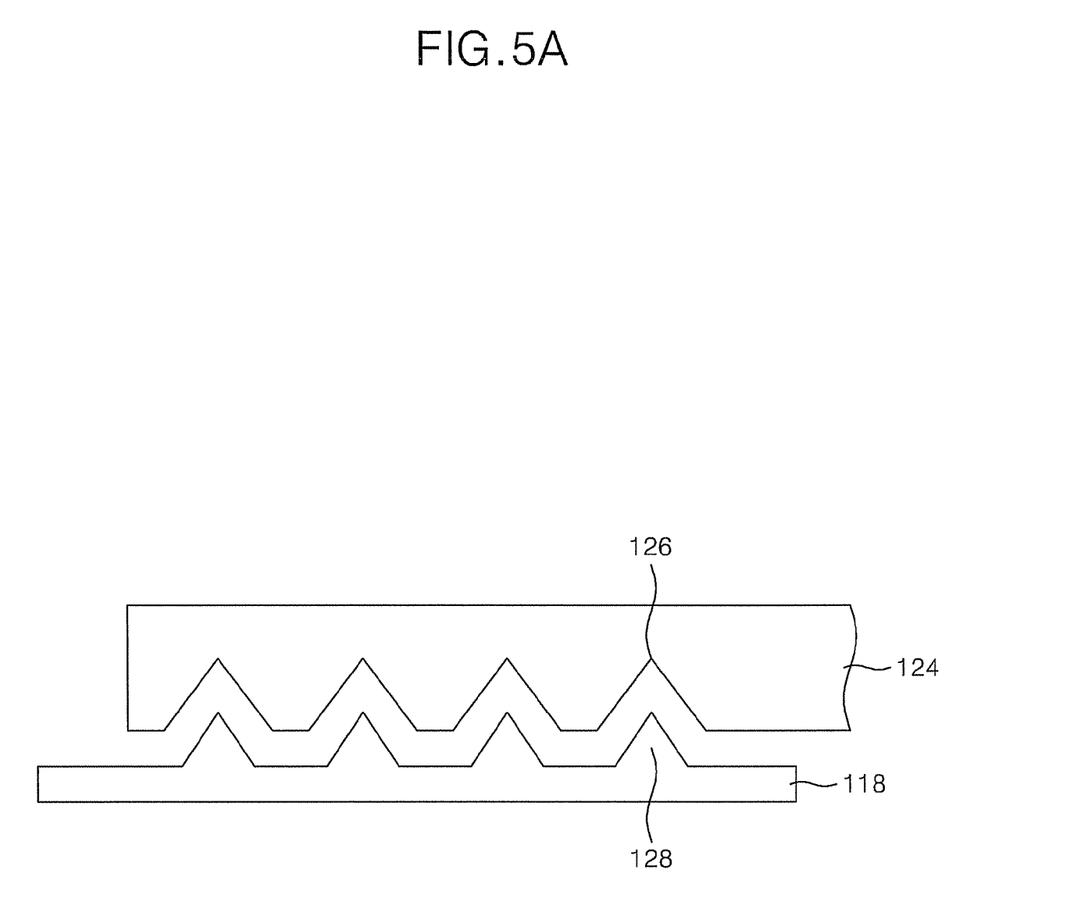
FIGS. 5A and 5B are cross-sectional views illustrating other exemplary embodiments of fixing protrusions and fixing grooves illustrated in FIG. 3.
Figure 5B:
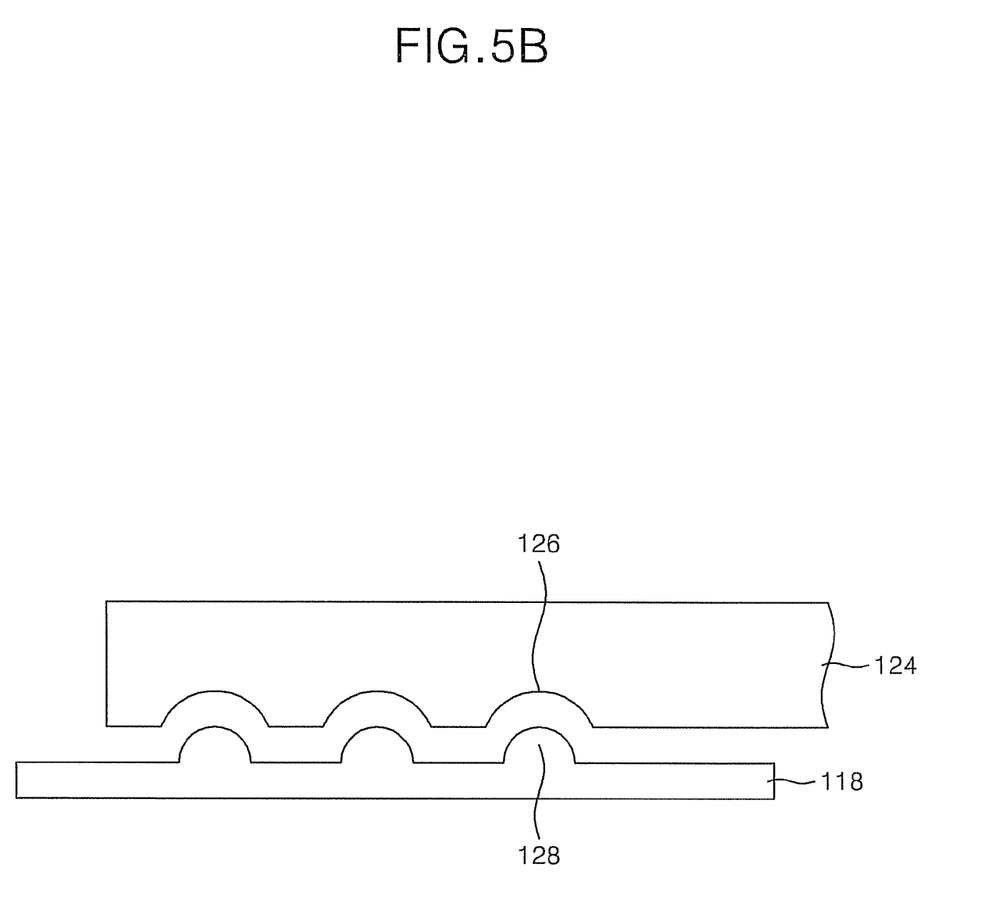

Referring to FIGS. 2B and 3, fixing protrusions 128 are formed on the light source substrate 118. The fixing protrusions 128 are coated with a metal having high reflectivity, such as aluminum, so that the fixing protrusions 128 serve as a reflective sheet. The fixing protrusions 128 are coupled to corresponding fixing grooves 126 of the light guide plate 124. The fixing protrusions 128 are formed (continuously) lengthwise substantially parallel to a longer (or longitudinal) side of the light source substrate 118, such as forming longitudinal "ribs" or "stripes." As a distance from the light guide plate 124 increases, widths of the fixing protrusions 128 are gradually increased. In exemplary embodiments, the fixing protrusions 128 may be formed in a right-angled triangular shape as shown in FIG. 4, in a triangular shape as in FIG. 5A and/or in a semi-circular or semi-elliptical shape as in FIG. 5B. The fixing protrusions 128 may be adjacent to each other as shown in FIG. 4 or may be spaced apart from each other as shown in FIGS. 5A and 5B. The incident surface of the light guide plate 124 contacts the emitting surface of each of the LEDs 116 as the fixing protrusions 128 are inserted into the fixing grooves 126. In exemplary embodiments, the shape of the fixing grooves 126 corresponds in shape, location and/or dimension of the fixing protrusions 128 as is suitable to secure the light guide plate 124 and light source substrate 118 such that the incident surface of the light guide plate 124 contacts the emitting surface of each of the LEDs 116.

The light guide plate 124 converts a relatively line-shaped light emitted from the LEDs 116 through its incident surface into a relatively surface-shaped light and guides the surface-shaped light toward the LCD panel 102. The light traveling toward the rear surface of the light guide plate 124 is reflected by the reflection sheet 154 and travels toward the light guide plate 124.

The light guide plate 124 includes the fixing grooves 126 coupled to the fixing protrusions 128 of the light source substrate 118 as shown in FIG. 4. The fixing grooves 126 are formed lengthwise and substantially parallel along the longer side of the light guide plate 124 in an area contacting with the light source substrate 118. The fixing grooves 126 have widths that are gradually reduced toward an upper surface from a lower surface (contacting the light source substrate 118) of the light guide plate 124. The fixing grooves 126 may be formed in a right-angled triangular shape as shown in FIG. 4, in a triangular shape as in FIG. 5A and/or in a semi-circular or semi-elliptical shape as in FIG. 5B.

The incident surface of the light guide plate 124 contacts the emitting surface of each of the LEDs 116 as the fixing protrusions 128 are inserted into the fixing grooves 126. Advantageously, the efficiency of light incident on the light guide plate 124 is increased.

Figure 6:
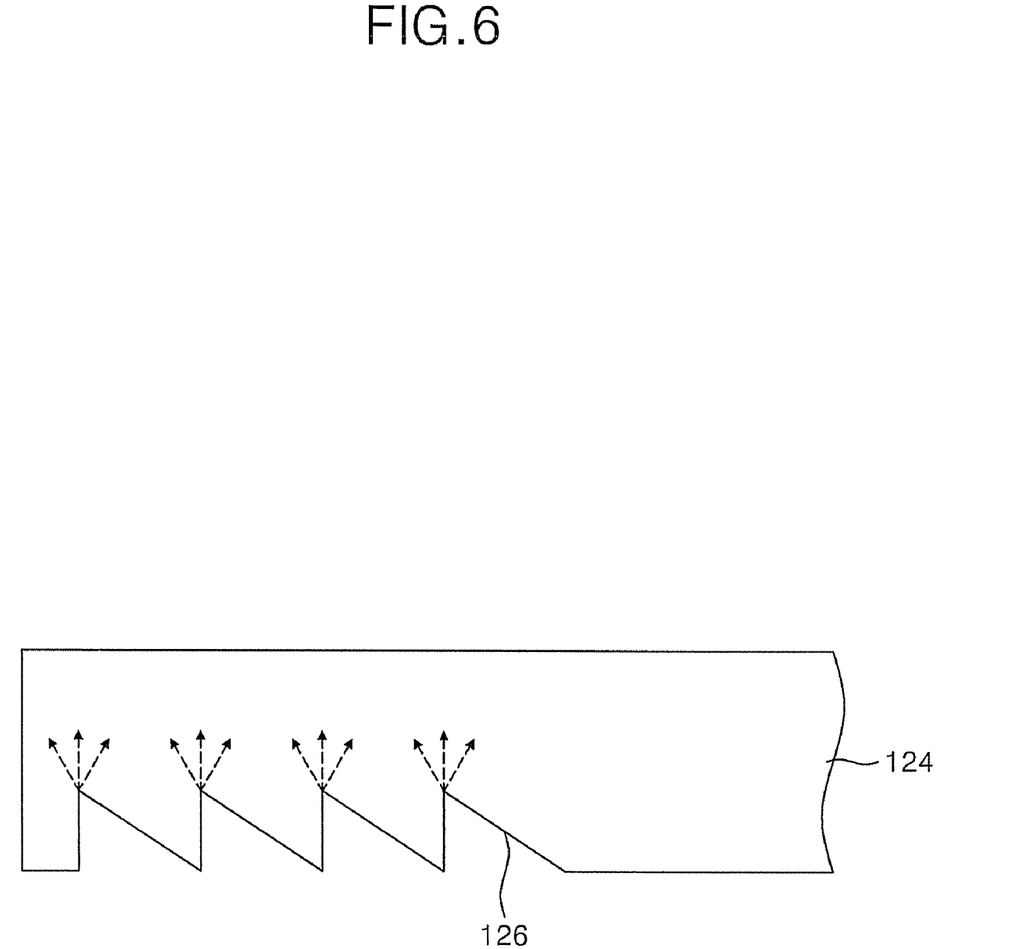
FIG. 6 is a view describing an exemplary embodiment of a scattering effect of light incident into fixing grooves of the LCD device of the present invention.

Light incident on the slanted surfaces of the light guide plate 124 exposed by the fixing grooves 126 is irregularly reflected and scattered as shown in FIG. 6. The light incident on the light guide plate 124 at non-overlapping portions of the emitting surface of each of the LEDs 116 is irregularly reflected and scattered at the slanted surfaces exposed by the fixing grooves 126. Advantageously, a luminance difference between the incident surface of the light guide plate 124 at the non-overlapping portions of the emitting surface of each of the LEDs 116 and those portions overlapping the emitting surface of each of the LEDs 116 can be reduced.

Figure 7A:
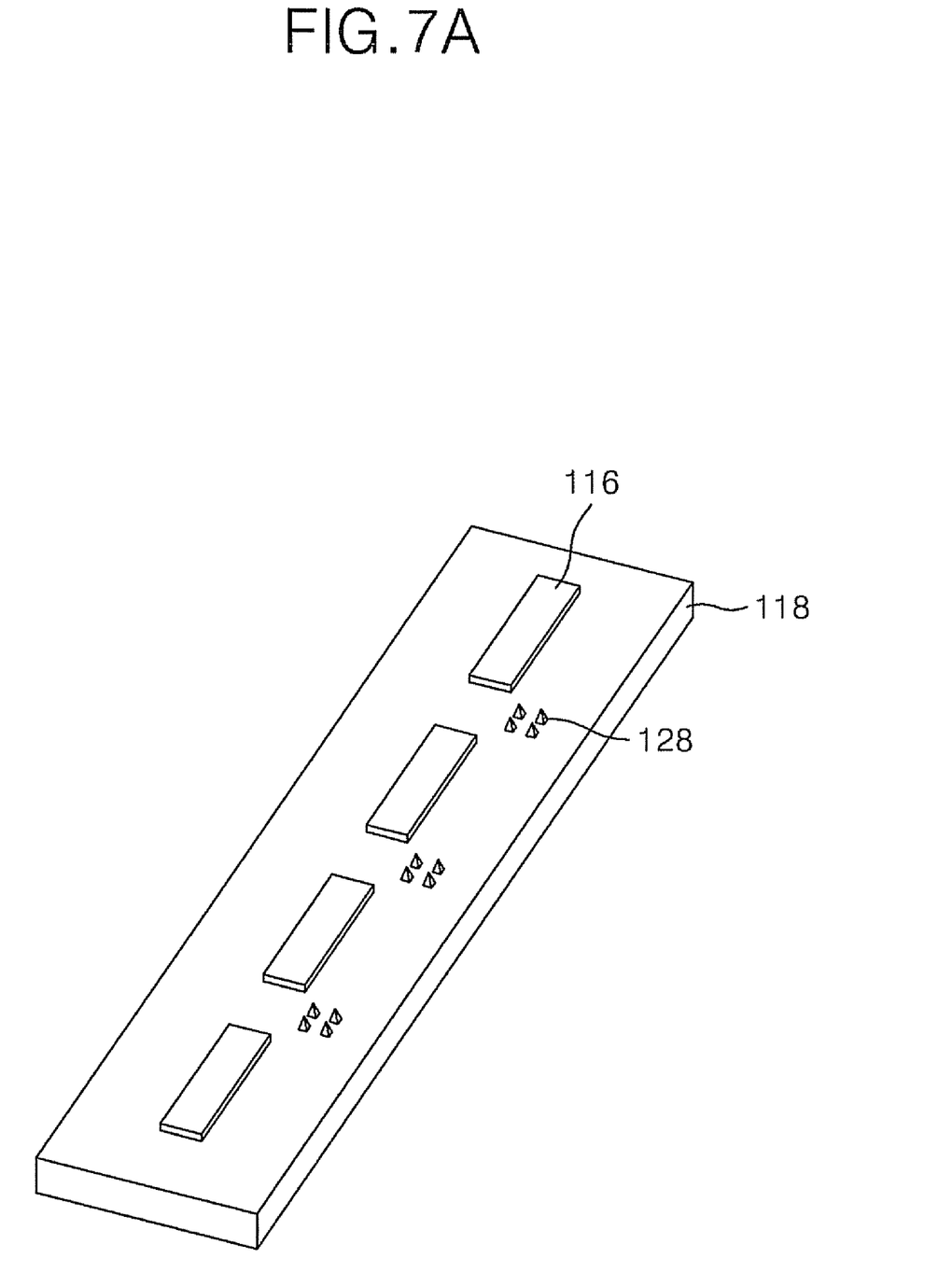
FIGS. 7A and 7B are perspective views illustrating exemplary embodiments of a light source substrate of an LCD device according to the present invention.
Figure 7B:
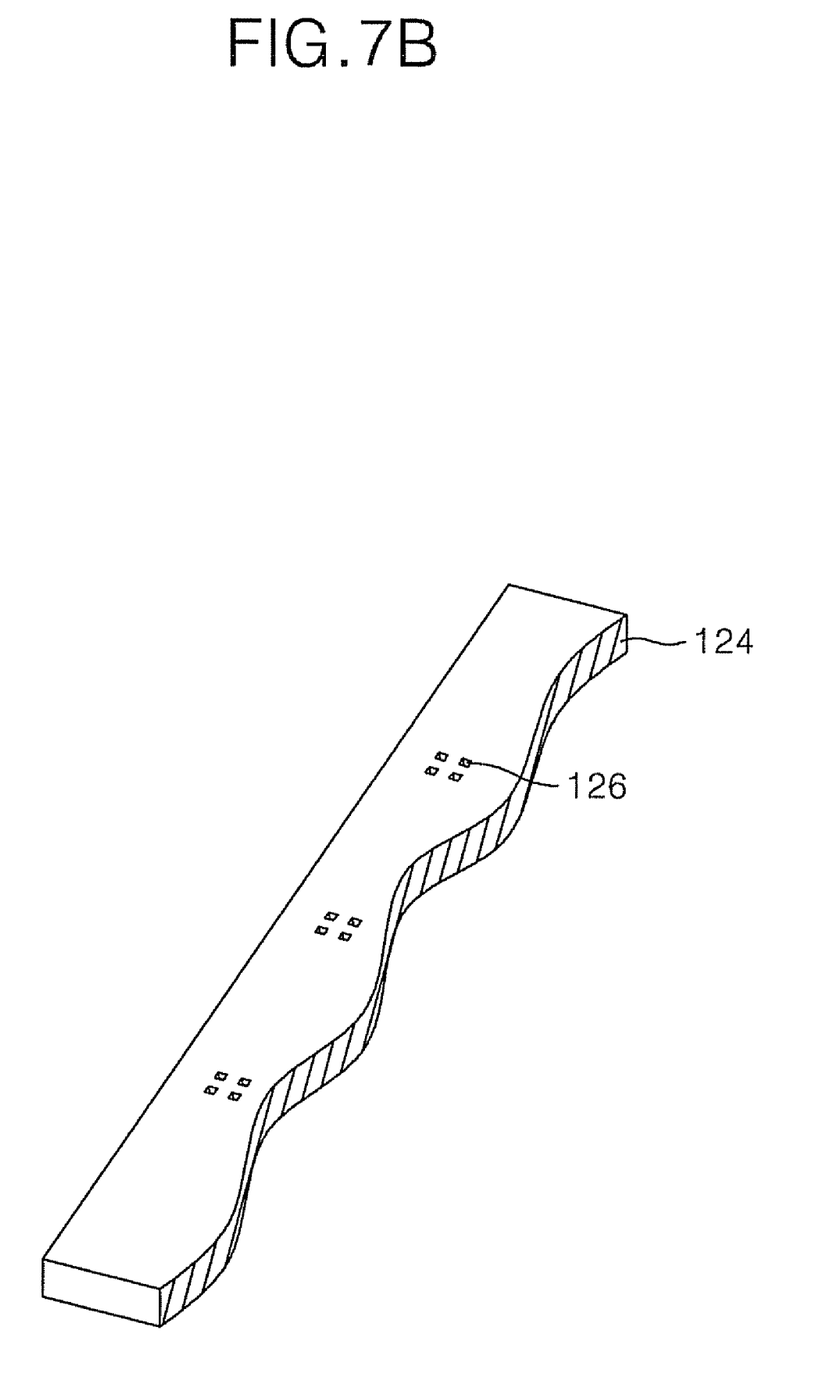
Figure 8A:
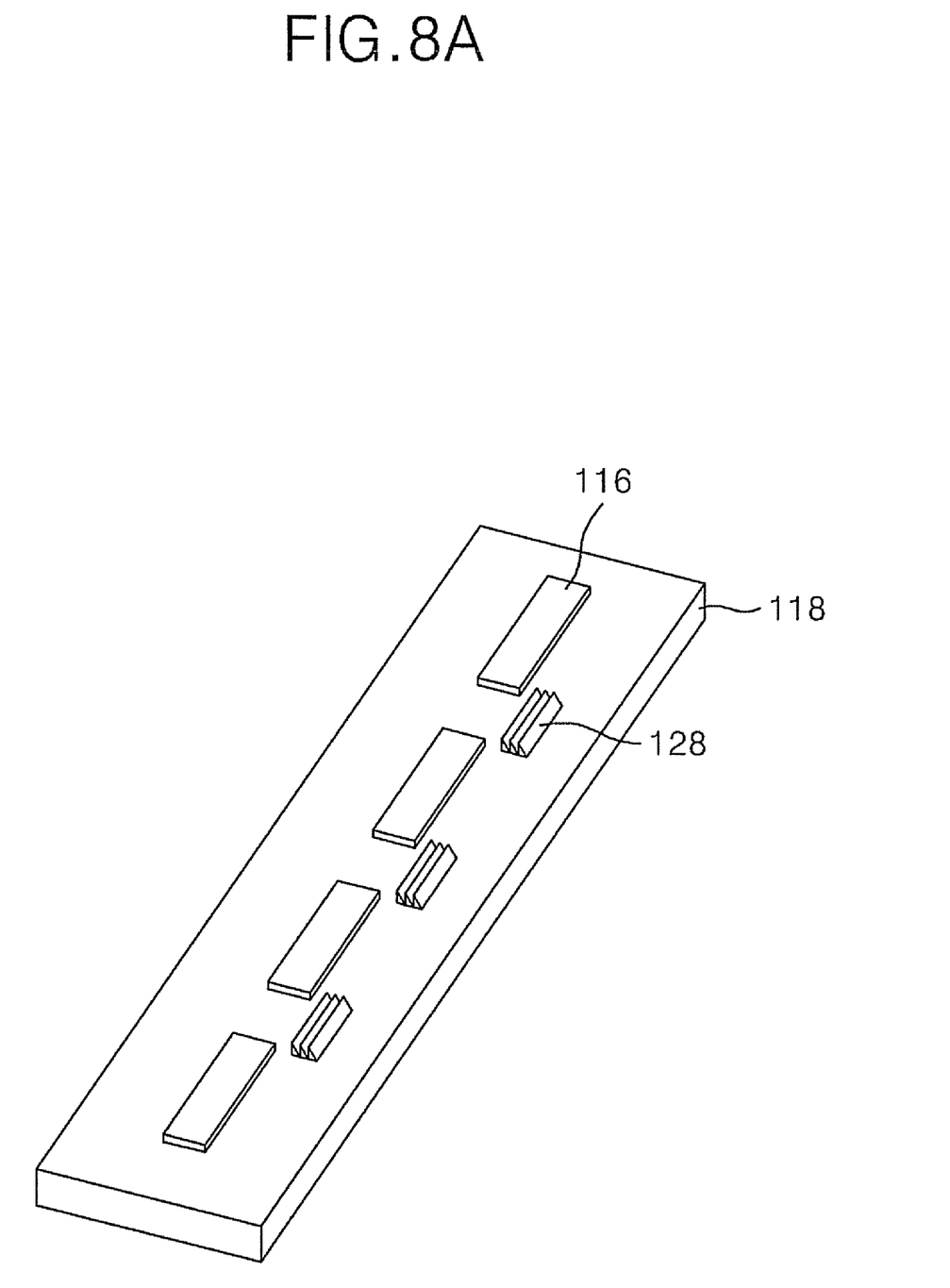
FIGS. 8A and 8B are perspective views illustrating exemplary embodiments of a light guide plate corresponding to the light source substrate illustrated in FIGS. 7A and 7B.
Figure 8B:
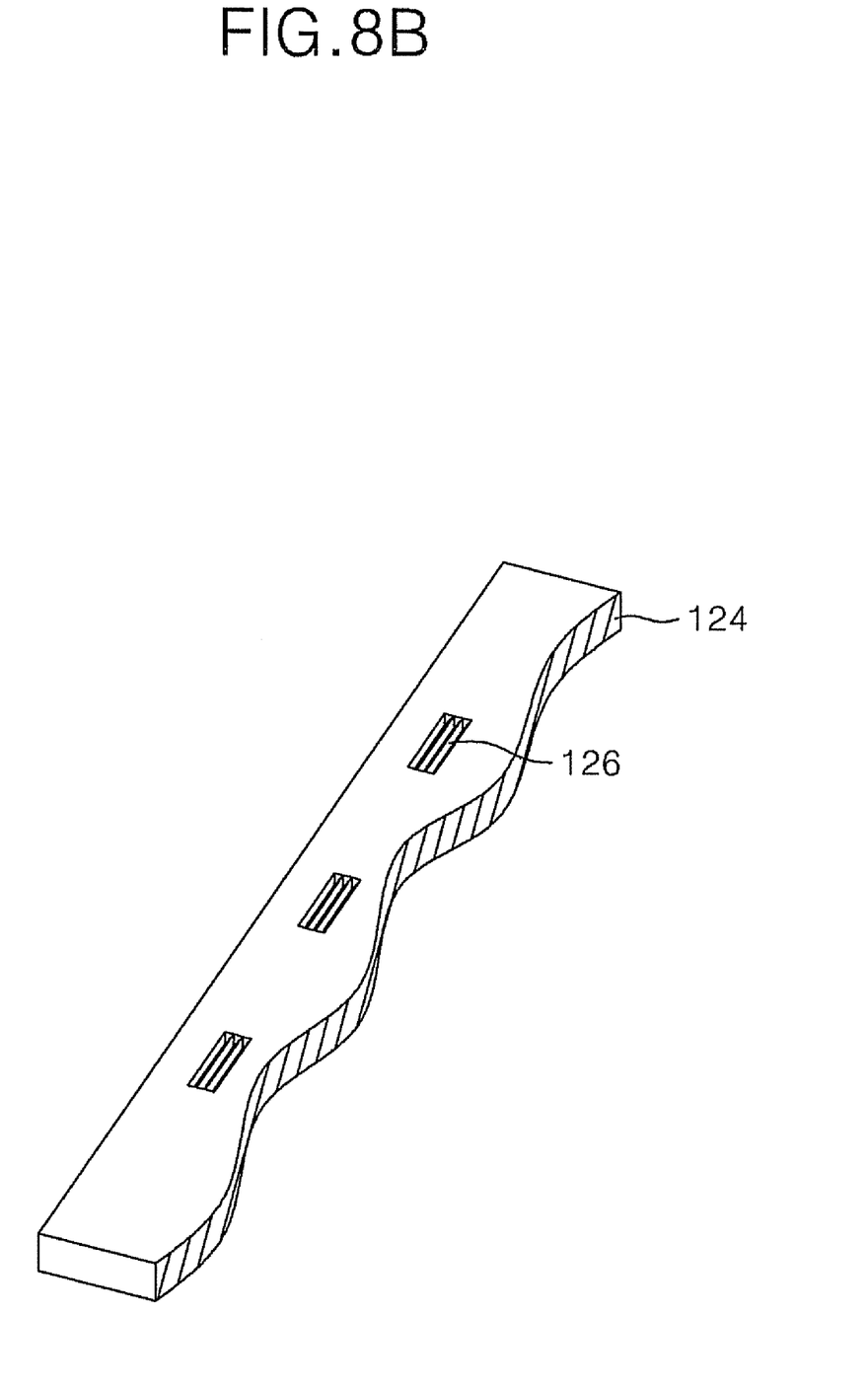

FIGS. 7A and 7B are perspective views of exemplary embodiments of a light source substrate of an LCD device according to the present invention. FIGS. 8A and 8B are perspective views of exemplary embodiments of a light guide plate contacting with the light source substrate illustrated in FIGS. 7A and 7B.

The light source substrate shown in FIGS. 7A and 7B has the same elements as that shown in FIGS. 2 and 3 except that the fixing protrusions and fixing grooves are formed in discrete pattern, such as in a dot shape. Therefore, a detailed description of the same elements will be omitted.

As illustrated in FIG. 7A, the fixing protrusions 128 are separately formed from each other in a dot shape on the light source substrate 118 in a region considered non-overlapping with the emitting surface of each of the LEDs 116. In an alternative exemplary embodiment, the fixing protrusions 128 are formed in a line or "ribbed" shape on the light source substrate 118 in a region that is non-overlapping the emitting surface of each of the LEDs 116 as shown in FIG. 8A. The fixing protrusions 128 may have widths that are gradually increased in a distance away from the surface of the light guide plate 124. In exemplary embodiments, the fixing protrusions 128 may be formed in a polygonal shape, such as in a right-angled triangular shape, in a semi-circular shape, or in a semi-elliptical shape. The incident surface of the light guide plate 124 contacts the emitting surface of each of the LEDs 116 as the fixing protrusions 128 are inserted into the fixing grooves 126.

The fixing grooves 126 are formed on the lower surface of the light guide plate 124 corresponding in location, shape and/or dimension to the fixing protrusions 128. The fixing grooves 126 may be formed in a dot shape in a region considered non-overlapping with the emitting surface of each of the LEDs 116 as shown in FIG. 7B such that the fixing protrusions 128 of a dot shape shown in FIG. 7A can be inserted thereinto. In an alternative exemplary embodiment, the fixing grooves 126 are formed in a groove shape having a length less than a separation distance between the LEDs 116 in a region that is non-overlapping the emitting surface of each of the LEDs 116 as shown in FIG. 8B so that the fixing protrusions 128 shown in FIG. 8A can be inserted thereinto. The fixing grooves 126 may have widths that are gradually decreased toward the upper surface from the lower surface of the light guide plate 124 such as to correspond to the fixing protrusions 128. In exemplary embodiments, the fixing grooves 126 may be formed in a polygonal shape, such as in a right-angled triangular shape, in a semi-circular shape, or in a semi-elliptical shape, such as to correspond to the fixing protrusions 128.

Since the incident surface of the light guide plate 124 contacts with the emitting surface of each of the LEDs 116 as the fixing protrusions 128 are inserted into the fixing grooves 126, the efficiency of light incident on the light guide plate 124 may be increased.

Light incident into the slanted surfaces of the light guide plate 124 exposed by the fixing grooves 126 is irregularly reflected and scattered. The light incident into the light guide plate 124 at non-overlapping portions of the emitting surface of each of the LEDs 116 is irregularly reflected and scattered at the slanted surfaces exposed by the fixing grooves 126. Advantageously, a luminance difference between the incident surface of the light guide plate 124 at the non-overlapping portions of the emitting surface of each of the LEDs 116 and those portions overlapping the emitting surface of each of the LEDs 116 can be reduced.

As in the illustrated exemplary embodiments, in the backlight unit and the LCD device including the same, the light guide plate and the light source substrate are arranged in such a manner that the incident surface of the light guide plate contacts the emitting surface of each of the LEDs by inserting the fixing protrusions of the light source substrate into the fixing grooves of the light guide plate. Since the incident surface of the light guide plate is in contact with the emitting surface of each of the LEDs, the efficiency of light incident into the light guide plate is increased.

In an exemplary embodiment, since an adhesive member such as a double-coated tape is unnecessary for attaching the fixing protrusions and fixing grooves for fixing the light guide plate to the light source substrate, an assembly process is simplified and cost can be saved.

In an exemplary embodiment, since light incident on the fixing grooves of a triangular, circular or elliptical shape is scattered, a luminance difference between a region where the incident surface of the light guide plate overlaps the emitting surface of each of the LEDs and a region non-overlapping the emitting surface of each of the LEDs can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A backlight unit, comprising:
   a plurality of light emitting diodes;
   a light source substrate on which the plurality of light emitting diodes is mounted;
   a light guide plate including a light incident surface contacting an emitting surface of each of the light emitting diodes, and converting line-shaped light generated from the light emitting diodes into a surface-shaped light;
   a first fixing part formed on the light source substrate in a region overlapping the light guide plate, wherein the light incident surface of the light guide plate is disposed between the emitting surface of the plurality of light emitting diodes and the first fixing part of the light source substrate; and
   a second fixing part formed on the light guide plate and coupled to the first fixing part.

2. The backlight unit according to claim 1, wherein the first fixing part is formed in a protrusion shape and substantially parallel with the light incident surface of the light guide plate, and the second fixing part is formed in a groove shape and substantially parallel with the light incident surface of the light guide plate.

3. The backlight unit according to claim 2, further comprising a plurality of the first fixing part, wherein the first fixing parts are disposed adjacent to each other along a transverse direction of the light source substrate, the transverse direction being substantially perpendicular to the light incident surface of the light guide plate.

4. The backlight unit according to claim 2, further comprising a plurality of the fist fixing part wherein the first fixing parts are spaced apart from each other along a transverse direction of the light source substrate.

5. The backlight unit according to claim 1, wherein the first fixing part protrudes in a dot shape in a region non-overlapping the emitting surface of each of the light emitting diodes and the second fixing part forms a groove in the dot shape in the region non-overlapping the emitting surface of each of the light emitting diodes.

6. The backlight unit according to claim 1, wherein the first fixing part protrudes in a line shape in a region non-overlapping the emitting surface of each of the light emitting diodes and the second fixing part forms a groove in a line shape in a region non-overlapping the emitting surface of each of the light emitting diodes.

7. The backlight unit according to claim 2, wherein the first fixing part has a width that becomes gradually increased in a direction away from the light guide plate.

8. The backlight unit according to claim 7, wherein the second fixing part has a width that becomes gradually narrower in a direction toward an upper part from a lower part of the light guide plate.

9. The backlight unit according to claim 8, wherein the first and second fixing parts are formed in a fight angle triangle, triangular, semi-circular or semi-elliptical shape.

10. The backlight unit according to claim 1, wherein the first fixing part is coated with a metal layer.

11. A liquid crystal display device, comprising:
a backlight unit generating light; and
a liquid crystal display panel displaying images using the light generated from the backlight unit;
wherein the backlight unit includes:
a plurality of light emitting diodes,
a light source substrate including a first surface on which the plurality of light emitting diodes is mounted, the first surface of the light source substrate contacting the plurality of light emitting diodes,
a light guide plate including a light incident surface contacting an emitting surface of each of the light emitting diodes, and converting line-shaped light generated from the light emitting diodes into a surface-shaped light,
a first fixing part formed on the light source substrate in a region overlapping the light guide plate, wherein the light incident surface of the light guide plate is disposed between the emitting surface of the plurality of light emitting diodes and the first fixing part of the light source substrate; and
a second fixing part formed on the light guide plate and coupled to the first fixing part.

12. The liquid crystal display device according to claim 11, wherein the first fixing part is formed in a protrusion shape and substantially parallel with the light incident surface of the light guide plate, and the second fixing part is formed in a groove shape and substantially parallel with the light incident surface of the light guide plate.

13. The liquid crystal display device according to claim 11, wherein the first fixing part protrudes in a dot shape in a region non-overlapping the emitting surface of each of the light emitting diodes and the second fixing part forms a groove in the dot shape in the region non-overlapping the emitting surface of each of the light emitting diodes.

14. The liquid crystal display device according to claim 11, wherein the first fixing part protrudes in a line shape in a region non-overlapping the emitting surface of each of the light emitting diodes and the second fixing part forms a groove in the line shape in the region non-overlapping the emitting surface of each of the light emitting diodes.

15. The liquid crystal display device according to claim 11, wherein the first and second fixing parts are formed in a right angle triangle, triangular, semi-circular or semi-elliptical shape.

16. The liquid crystal display device according to claim 15, wherein the first fixing part has a width that becomes gradually increased in a direction away from the light guide plate, and wherein the second fixing part has a width that becomes gradually narrower in a direction toward an upper part from a lower part of the light guide plate.

17. The liquid crystal display device according to claim 11, wherein the first fixing part is coated with a metal layer.

18. A method of forming a backlight unit, the method comprising:
mounting a plurality of light emitting diodes contacting an upper surface of a light source substrate;
disposing the light source substrate on a portion of a light guide plate;
forming a first fixing part protruded from the upper surface of the light source substrate in a region of the upper surface overlapping the light guide plate converting line-shaped light generated from the light emitting diodes into a surface-shaped light;
forming a second fixing part recessed from a lower surface of the light guide plate, the lower surface facing the upper surface of the light source substrate; and
coupling the first fixing part and the second fixing part;
wherein a light incident side of the light guide plate facing an emitting surface of each of the light emitting diodes contacts the emitting surface of each of the light emitting diodes, and
wherein the first fixing part is protruded substantially parallel to the light incident side of the light guide plate.

19. The method according to claim 18, wherein the first fixing part is formed in a protrusion shape and forming a first fixing part includes disposing the first fixing part parallel with a longitudinal direction of the light source substrate; and
wherein the second fixing part is formed in a groove shape corresponding to the first fixing part and forming a second fixing part includes disposing the second fixing part parallel with a longitudinal direction of the light source substrate.

* * * * *